United States Patent
Matsumoto et al.

(10) Patent No.: US 10,926,755 B2
(45) Date of Patent: Feb. 23, 2021

(54) HYBRID VEHICLE

(71) Applicant: TOYOTA JIDOSHA KABUSHIKI KAISHA, Aichi-ken (JP)

(72) Inventors: Arifumi Matsumoto, Gotemba (JP); Akinori Morishima, Kanagawa-ken (JP); Taku Ibuki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 246 days.

(21) Appl. No.: 16/226,639

(22) Filed: Dec. 20, 2018

(65) Prior Publication Data

US 2019/0232946 A1 Aug. 1, 2019

(30) Foreign Application Priority Data

Jan. 29, 2018 (JP) .............................. JP2018-012675

(51) Int. Cl.
*B60W 20/13* (2016.01)
*B60W 20/00* (2016.01)
(Continued)

(52) U.S. Cl.
CPC .............. *B60W 20/13* (2016.01); *B60K 6/24* (2013.01); *B60L 58/13* (2019.02); *B60W 10/06* (2013.01); *B60W 10/30* (2013.01); *B60W 20/00* (2013.01); *B60W 20/15* (2016.01); *B60W 30/192* (2013.01); *B60W 50/0097* (2013.01); *B60K 6/445* (2013.01); *B60W 2510/06* (2013.01); *B60W 2510/244* (2013.01); *B60W 2710/06* (2013.01); *B60W 2710/0633* (2013.01); *B60W 2710/0638* (2013.01); *B60W 2710/0688* (2013.01); *F02D 2200/0414* (2013.01)

(58) Field of Classification Search
CPC ............ B60W 30/085; B60W 30/0956; G05D 1/0088; G05D 1/0276; G08G 1/162; G08G 1/166
See application file for complete search history.

(56) References Cited

U.S. PATENT DOCUMENTS 9,428,171 B2 * 8/2016 Kwon ...................... B60K 6/48
2008/0276913 A1 11/2008 Zubeck
(Continued)

FOREIGN PATENT DOCUMENTS

EP 2724883 A1 4/2014
JP 2002-317640 A 10/2002

*Primary Examiner* — Ramsey Refai
(74) *Attorney, Agent, or Firm* — Hauptman Ham, LLP (57) ABSTRACT

A controller for the hybrid vehicle selects an engine as a power apparatus of the hybrid vehicle when a request load is higher than a threshold load, and selects ae motor as the power apparatus when the request load is equal to or lower than the threshold load. The controller sets the threshold load in accordance with a SOC of a battery, and decreases the threshold load as the SOC is lower in at least a predetermined SOC range. The controller controls an intake air temperature during stopping of the engine to a target intake air temperature by operating an intake air temperature variable system when the motor is selected as the power apparatus. The controller sets the target intake air temperature in accordance with the SOC, and increases the target intake air temperature as the SOC is lower in at least the predetermined SOC range.

6 Claims, 6 Drawing Sheets

(51) Int. Cl.
*B60W 10/06* (2006.01)
*B60W 50/00* (2006.01)
*B60W 20/15* (2016.01)
*B60W 10/30* (2006.01)
*B60W 30/192* (2012.01)
*B60K 6/24* (2007.10)
*B60L 58/13* (2019.01)
*B60K 6/445* (2007.10)

(56) References Cited

U.S. PATENT DOCUMENTS

| | | | |
|---|---|---|---|
| 2012/0185119 A1 | 7/2012 | Abe et al. | |
| 2013/0226389 A1* | 8/2013 | Yamazaki | B60K 6/442 |
| | | | 701/22 |
| 2014/0288742 A1* | 9/2014 | Hokoi | B60W 20/12 |
| | | | 701/22 |
| 2015/0291051 A1* | 10/2015 | Morimoto | B60L 50/16 |
| | | | 307/10.1 |

* cited by examiner

HYBRID VEHICLE

CROSS-REFERENCE TO RELATED APPLICATION

This application claims priority to Japanese Patent Application No. 2018-012675, filed on Jan. 29, 2018, which is incorporated by reference herein in its entirety.

BACKGROUND

Field

The present disclosure relates to a hybrid vehicle capable of selecting traveling by a motor and traveling by an engine.

Background Art

It is known that an intake air temperature affects the combustion stability of an engine. In JP2002-317640A, it is disclosed to ensure the combustion stability of the engine by increasing the intake air temperature when the engine is operating in a low load range compared with the case where the engine is operating in a medium-high load range.

In the case of a hybrid vehicle capable of selecting traveling by a motor and traveling by an engine, stopping and restarting of the engine are repeated. When the engine restarts in a state where the hybrid vehicle is traveling by using the motor, the load of the engine depends on the operating state at the motor traveling. Depending on the relation between the load of the engine at restarting and the intake air temperature, the combustion stability of the engine may deteriorate so that the engine cannot restart successfully.

SUMMARY

The present disclosure has been devised in view of such problems, and an object of the present disclosure is to provide a hybrid vehicle capable of ensuring the combustion stability of an engine when the engine restarts in a state where the hybrid vehicle is traveling by using a motor.

A hybrid vehicle according to the present disclosure is a hybrid vehicle having an engine for traveling, a motor for traveling, and a battery for storing electric power to be supplied to the motor. The hybrid vehicle according to the present disclosure comprises an intake air temperature variable system that changes an intake air temperature during stopping of the engine and a controller.

The controller is configured to execute at least the following first to fourth processing.

In the first processing, the controller selects the engine as a power apparatus of the hybrid vehicle when a request load is higher than a threshold load, and selects the motor as the power apparatus when the request load is equal to or lower than the threshold load. In the second processing, the controller sets the threshold load in accordance with a SOC (State of Charge) of the battery, and decreases the threshold load as the SOC is lower in at least a predetermined SOC range. By the controller executing the first and second processing, a motor traveling range where the hybrid vehicle travels by using the motor is expanded to a high load side as the SOC is higher in at least the predetermined SOC range, and is reduced to a low load side as the SOC is lower in the same SOC range.

In the third processing, the controller controls the intake air temperature during the stopping of the engine to a target intake air temperature by operating the intake air temperature variable system when the motor is selected as the power apparatus. In the fourth processing, the controller sets the target intake air temperature in accordance with the SOC, and increases the target intake air temperature as the SOC is lower in at least the predetermined SOC range. By the controller executing the third and fourth processing, the intake air temperature during the stopping of the engine is controlled to a lower temperature as the SOC is higher in at least the predetermined SOC range, and is controlled to a higher temperature as the SOC is lower in the same SOC range.

According to the hybrid vehicle comprising the controller configured as above, the intake air temperature during the stopping of the engine is controlled to a higher temperature when the possibility of the engine restarting in the low load range has increased as a result of the motor traveling range being reduced to the low load side due to the low SOC. Then, in at least the predetermined SOC range, the intake air temperature during the stopping of the engine is controlled to a higher temperature as the motor traveling range is reduced to the low load side. Controlling the intake air temperature as above ensures the combustion stability when the engine restarts.

Also, according to the hybrid vehicle comprising the controller configured as above, the intake air temperature during the stopping of the engine is controlled to a lower temperature when the possibility of the engine restarting in the low load range has decreased as a result of the motor traveling range being expanded to the high load side due to the high SOC. Then, in at least the predetermined SOC range, the intake air temperature during the stopping of the engine is controlled to a lower temperature as the motor traveling range is expanded to the high load side. This makes it possible to reduce NOx emission and improve fuel economy while ensuring the combustion stability when the engine restarts.

The controller may be configured to set the target intake air temperature to a predetermined upper limit temperature in the fourth processing when the SOC is lower than the predetermined SOC range. Also, the controller may be configured to set the target intake air temperature to a predetermined lower limit temperature in the fourth processing when the SOC is higher than the predetermined SOC range. Limiting the target intake air temperature by the upper limit temperature suppresses deterioration of the NOx emission and the fuel economy. Limiting the target intake air temperature by the lower limit temperature suppresses deterioration of the combustion stability.

The controller may be configured to correct the threshold load to a low load side in the second processing and correct the target intake air temperature to a high temperature side in the fourth processing when a temperature of the battery is higher than a predetermined temperature range. Also, the controller may be configured to correct the threshold load to the low load side in the second processing and corrects the target intake air temperature to the high temperature side in the fourth processing when the temperature of the battery is lower than the predetermined temperature range. Charging and discharging of the battery is affected by the temperature of the battery and is restricted both at a temperature higher than an appropriate temperature range and at a temperature lower than the appropriate temperature range. Therefore, performing corrections as above suppresses the influence of the temperature of the battery and ensures the combustion stability when the engine restarts.

The controller may be configured to set the target intake air temperature to a predetermined upper limit temperature in the fourth processing when an abnormality occurs in the motor or a control system thereof. The abnormality makes it difficult to determine the operating range where the power apparatus is switched from the motor to the engine. Therefore, assuming switching in the low load range where the combustion stability of the engine tends to deteriorate, the intake air temperature during the stopping of the engine is controlled to the upper limit temperature. This ensures the combustion stability when the engine restarts.

As described above, according to the hybrid vehicle according to the present disclosure, the combustion stability of the engine is ensured when the engine restarts in a state where the hybrid vehicle is traveling by using a motor.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly specified by the numerals theoretically. Furthermore, structures and steps that are described in the embodiments shown as follows are not always indispensable to the disclosure unless specially explicitly shown otherwise, or unless the disclosure is explicitly specified by the structures or the steps theoretically.

1. Configuration of Hybrid System of Hybrid Vehicle

Figure 1:
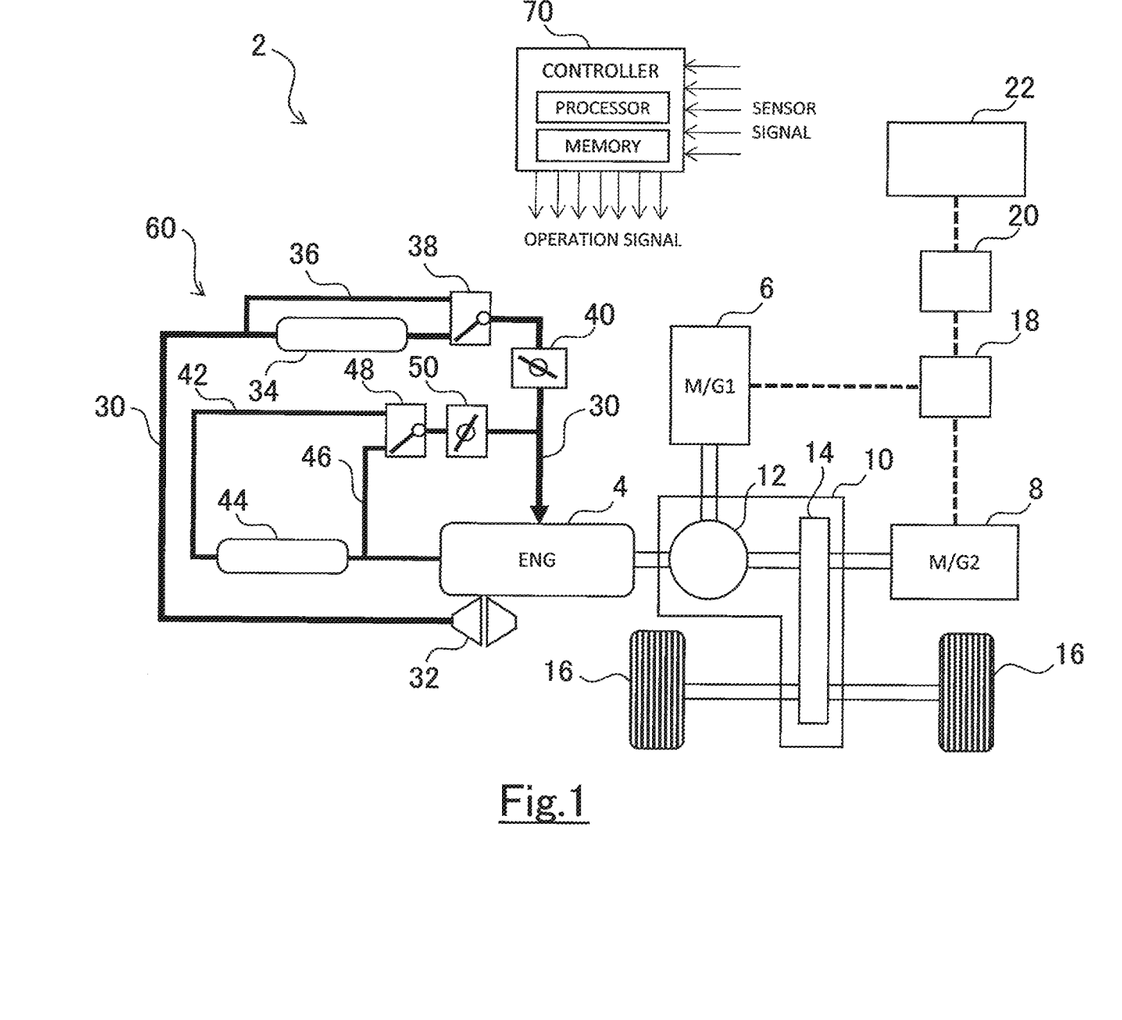
FIG. 1 is a view illustrating a configuration of a hybrid system of a hybrid vehicle according to an embodiment of the present disclosure.

FIG. 1 is a view illustrating a configuration of a hybrid system of a hybrid vehicle according to the present embodiment. As shown in FIG. 1, the hybrid vehicle 2 comprises an engine 4 as one power apparatus for driving wheels 16. The engine 4 is an internal combustion engine that outputs power by combustion of hydrocarbon-based fuel such as gasoline or light oil, and comprises an intake device, an exhaust device, a fuel injection device, an ignition device, a cooling device, an EGR device, and the like. The configurations of the intake device and the EGR device are shown in FIG. 1.

The intake device shown in FIG. 1 is an intake device with a supercharging device. A turbocharger 32 for supercharging air is disposed in an intake passage 30 through which air taken into the engine 4 flows. In the intake passage 30 on the downstream side of the turbocharger 32, there are provided an intercooler 34 for cooling the supercharged air, a bypass passage 36 for bypassing the intercooler 34, and a passing ratio adjusting valve 38 for adjusting the ratio between the air passing the intercooler 34 and the air passing the bypass passage 36. In the intake passage 30 on the downstream side of the passing ratio adjusting valve 38, there is provided a throttle valve 40 for adjusting the flow rate of the air taken into the engine 4.

The EGR device shown in FIG. 1 is a HPL-EGR device. An EGR passage 42 that branches from an exhaust passage (not shown) on the upstream side of a turbine of the turbocharger 32 is connected to the intake passage 30 on the downstream side of the throttle valve 40. In the EGR passage 42, there are provided an EGR cooler 44 for cooling EGR gas, a bypass passage 46 for bypassing the EGR cooler 44, and a passing ratio adjusting valve 48 for adjusting the ratio between the EGR gas passing the EGR cooler 44 and the EGR gas passing the bypass passage 46. In the EGR passage 42 on the downstream side of the passing ratio adjusting valve 48, there is provided an EGR valve 50 for adjusting the flow rate of the EGR gas recirculated to the engine 4.

The intake device and the EGR device configured as above constitute an intake air temperature variable system 60 that changes the intake air temperature during stopping of the engine 4. Note that "during stopping of the engine 4" means that fuel cut is being performed and does not mean that the rotation of the engine 4 is stopped. The followings are examples of how the intake air temperature variable system 60 changes the intake air temperature. At least one of the exemplified methods is adopted in the intake air temperature variable system 60.

First example: To change the temperature of the EGR gas recirculated to the engine 4 by changing the ratio of the EGR gas passing through the EGR cooler 44 by the passing ratio adjusting valve 48

Second example: To change the flow rate of the EGR gas recirculated to the engine 4 by adjusting the opening degree of the EGR valve 50

Third example: To change the temperature of the air taken into the engine 4 by changing the ratio of the air (fresh air) passing through the intercooler 34 by the passing ratio adjusting valve 38

Fourth example: To change the flow rate of the air taken into the engine 4 by adjusting the opening degree of the throttle valve 40

Fifth example: To change the temperature of the EGR gas recirculated to the engine 4 by changing the temperature of the cooling water of the EGR cooler 44 (specifically, there are exemplified such methods as on/off control of the cooling water supply to a radiator, adjusting the amount of water passing through the radiator, on/off control of a radiator fan, adjusting the rotation speed of the radiator, on/off control of the heater, and adjusting the heating capacity of the heater.)

Sixth example: To change the temperature of the air taken into the engine 4 by changing the temperature of the cooling water of the intercooler 44 (specific methods are the same as those of the fifth example.)

Seventh example: To change the flow rate of the air taken into the engine 4 by adjusting the rotation speed of a motor for driving a compressor of the turbocharger 32 if the turbocharger 32 is equipped with such a motor Eighth example: To change the intake air temperature by on/off control or heating capacity adjustment of a heater if the heater is disposed in the intake passage 30 on the downstream side of the throttle valve 40, or in the EGR passage 43 on the downstream side of the EGR valve 50

The explanation about the configuration of the hybrid system will be restarted. The hybrid vehicle 2 comprises a first motor-generator 6 and a second motor-generator 8 that are electric motors capable of generating electric power as another power apparatus for driving the wheels 16. Each of the first motor-generator 6 and the second motor-generator 8 is a synchronous motor-generator having both a function as a motor for outputting torque by using supplied electric power and a function as a generator for converting inputted mechanical power into electric power. The first motor-generator 6 is mainly used as the generator, and the second motor-generator 8 is mainly used as the motor. Hereinafter, for the sake of clarity, the first motor-generator 6 is simply referred to as the generator 6, and the second motor-generator 8 is simply referred to as the motor 8.

The engine 4, the generator 6 and the motor 8 are connected to the wheels 16 by a power transmission mechanism 10. The power transmission mechanism 10 includes a power distribution mechanism 12 and a speed reduction mechanism 14. The power distribution mechanism 12 is a planetary gear unit for example and divides the torque output from the engine 4 to the torque for the generator 6 and the torque for the wheels 16. The torque output from the engine 4 and the torque output from the motor 8 are transmitted to the wheels 16 via the speed reduction mechanism 14.

The generator 6 regenerates electric power by the torque supplied via the power distribution mechanism 12. By performing power regeneration by the generator 6 when torque is not output from the engine 4 and the motor 8, braking force is transmitted from the generator 6 to the wheels 16 via the power transmission mechanism 10, and the hybrid vehicle 2 decelerates. That is, the hybrid vehicle 2 can perform regenerative braking by using the generator 6.

The generator 6 and the motor 8 exchange power with a battery 22 via an inverter 18 and a convertor 20. The inverter 18 converts the electric power stored in the battery 22 from direct current to alternating current and supplies it to the motor 8, and converts the electric power generated by the generator 6 from alternating current to direct current and stores it in the battery 22. Therefore, the battery 22 is charged by the electric power generated by the generator 6, and is discharged by the electric power consumed by the motor 8.

The hybrid vehicle 2 comprises a controller 70. The controller 70 operates the engine 4, the generator 6, the motor 8, the power transmission mechanism 10 and the like to control traveling of the hybrid vehicle 2. Also, the controller 70 obtains voltage information from the battery 22 and monitors a SOC (State of Charge) of the batter 22 based on the voltage information. The controller 70 is an ECU (electronic control unit) comprising at least one processor and at least one memory. Various programs and various data including maps for controlling the hybrid vehicle 2 are stored in the memory. When programs stored in the memory are executed by the processor, various functions are implemented to the controller 70. Note that the controller 70 may consists of a plurality of ECUs.

2. Functions of Controller of Hybrid Vehicle

Figure 2:
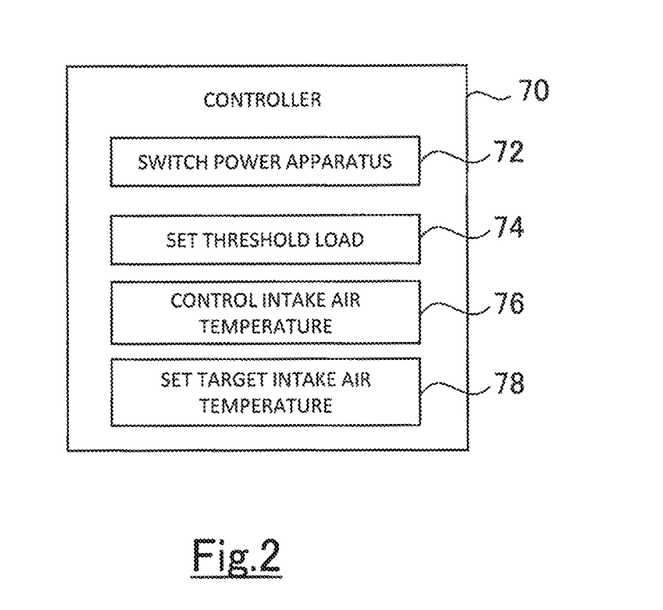
FIG. 2 is a diagram showing functions of a controller of the hybrid vehicle according to the embodiment of the present disclosure.

FIG. 2 is a block diagram showing a part of the functions of the controller 70. In FIG. 2, functions relating to switching from traveling by the motor 8 to traveling by the engine 4 are extracted among the various functions of the controller 70, and represented by blocks. Although the controller 70 has various other functions, illustration thereof is omitted. In FIG. 2, processing units 72, 74, 76, 78 are allocated for respective functions. However, each processing unit 72, 74, 76, 78 does not exist as hardware, but is realized when a program stored in the memory is executed by the processor. Hereinafter, the functions of the processing units 72, 74, 76, 78 will be described with reference to FIGS. 3, 4, and 5.

Figure 3:
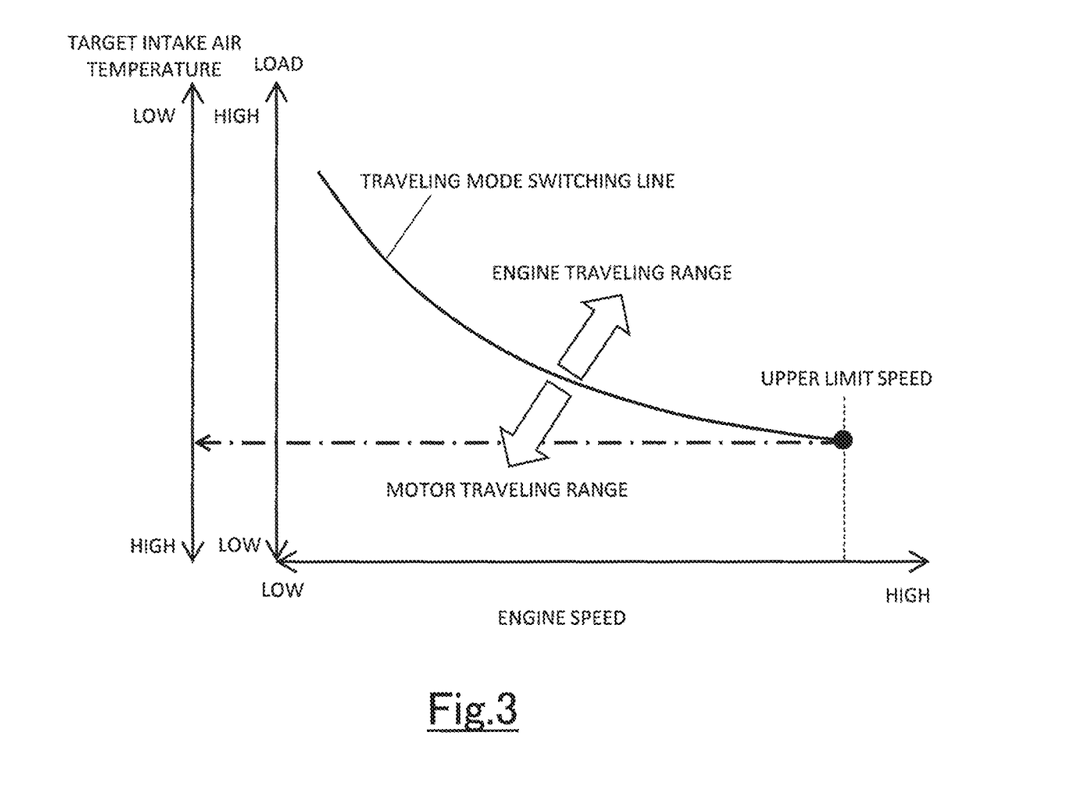
FIG. 3 is a diagram showing a relation between a traveling mode switching line and a target intake air temperature.

The first processing unit 72 switches the power apparatus between the engine 4 and the motor 8 in accordance with the load required for the hybrid system. A map of which the image is shown in FIG. 3 is used for this switching. In this map, a traveling mode switching line is defined with the load and the engine speed. Traveling mode of the hybrid vehicle 2 includes a motor traveling mode in which the hybrid vehicle 2 travels by using the motor 8 only and an engine traveling mode in which the hybrid vehicle 2 travels by using the engine 4 mainly. The traveling mode switching line is a border line between a motor traveling range that is an operating range where the motor traveling mode is selected and an engine traveling range where the engine traveling mode is selected, and is a line that defines a threshold load for each engine speed. The first processing unit 72 selects the engine 4 as the power apparatus when a request load is higher than the threshold load determined by the engine speed, and selects the motor 8 as the power apparatus when the request load is equal to or lower than the threshold load determined by the engine speed.

Figure 4:
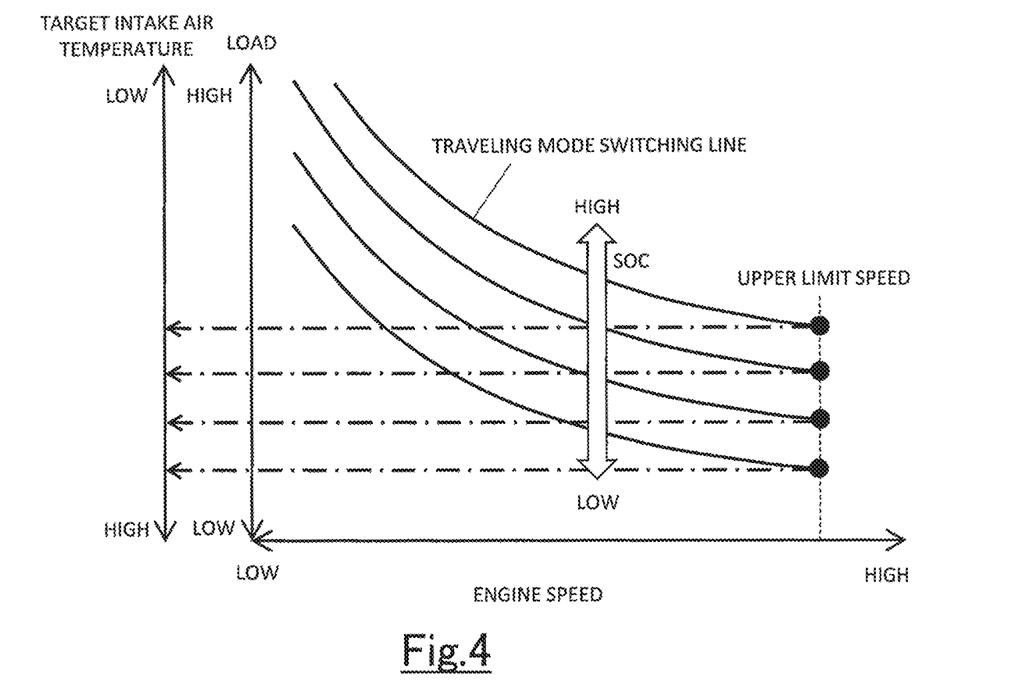
FIG. 4 is a diagram showing a relation between a SOC of a battery, a position of the traveling mode switching line and the target intake air temperature.

The second processing unit 74 sets the threshold load for each engine speed used by the first processing unit 72 in accordance with the SOC of the battery 22. That is, as shown in FIG. 4, the second processing unit 74 sets the position of the traveling mode switching line in the load direction in accordance with the SOC of the battery 22. When the SOC of the battery 22 is high, the motor traveling range can be expanded because the battery 22 has sufficient electric power available for motor traveling. Therefore, the second processing unit 74 sets the traveling mode switching line to a high load side as the SOC of the battery 22 is higher. In other words, the second processing unit 74 increases the threshold load for each engine speed as the SOC of the battery 22 is higher. However, the load of the motor traveling range has an upper limit. Therefore, when the SOC of the battery 22 is higher than a predetermined upper threshold, the second processing unit 74 keeps the traveling mode switching line to a predetermined upper limit line without moving the traveling mode switching line to the high load side further.

On the other hand, when the SOC of the battery 22 is low, the motor traveling range has to be reduced because the battery 22 does not have sufficient electric power available for motor traveling. Therefore, the second processing unit 74 sets the traveling mode switching line to a low load side as the SOC of the battery 22 is lower. In other words, the second processing unit 74 decreases the threshold load for each engine speed as the SOC of the battery 22 is lower. However, the load of the motor traveling range has a lower limit. Therefore, when the SOC of the battery 22 is lower than a predetermined lower threshold, the second processing unit 74 keeps the traveling mode switching line to a predetermined lower limit line without moving the traveling mode switching line to the low load side further.

By the threshold load being set as above, in the SOC range defined by the upper threshold and the lower threshold, the motor traveling range is expanded to the high load side as the SOC of the battery 22 is higher, and is reduced to the low load side as the SOC of the battery 22 is lower. Note that the change of the threshold load with respect to the SOC in the above SOC range may be a continuous change or a stepwise change.

Next, each function of the third processing unit 76 and the fourth processing unit 78 will be described with reference to FIGS. 3, 4, and 5.

The third processing unit 76 controls the intake air temperature during the stopping of the engine 4 to a target intake air temperature by operating the intake air temperature variable system 60 when the motor 8 is selected as the power apparatus. The target intake air temperature is a temperature by which the combustion stability of the engine 4 is ensured when the engine 4 restarts. The combustion stability of the engine 4 when the engine 4 restarts depends on the intake air temperature with respect to the load if the engine speed is constant. Specifically, in order to ensure the combustion stability of the engine 4, the intake air temperature needs to be increased as the load is lower. However, when the engine 4 restarts in a state where the hybrid vehicle 2 is traveling by using the motor 8, the load and speed of the engine 4 depend on the operating state at the motor traveling. Therefore, it is difficult to determine at which the operating point the engine 4 starts in the engine traveling range.

As shown in FIG. 3, the threshold load on the traveling mode switching line decreases as the engine speed is higher, and becomes a minimum value when the engine speed reaches an upper limit speed. The threshold load corresponding to the upper limit speed is the minimum load that the engine 4 can take at the restarting. According to a relation between the load and the intake air temperature to ensure the combustion stability, the intake air temperature required when the engine 4 starts becomes a maximum value at the minimum load. To ensure the combustion stability of the engine 4 when the engine 4 restarts irrespective of the load and engine speed at the restarting, it is needed to set an assumable maximum intake air temperature as the target intake air temperature. Therefore, in the present embodiment, the target intake air temperature is set to a temperature by which the combustion stability is surely ensured when the engine 4 restarts at the operating point corresponding to the upper limit speed on the traveling mode switching line. Note that the method for controlling the intake air temperature by operating the intake air temperature variable system 60 is as described above.

The fourth processing unit 78 sets the target intake air temperature used by the third processing unit 76 in accordance with SOC of the battery 22. As shown in FIG. 4, the position of the traveling mode switching line in the load direction is set in accordance with the SOC of the battery 22. Thus, the operating point corresponding to the upper limit speed on the traveling mode switching line (hereafter, referred to as "limit operation point") changes in accordance with the SOC. Specifically, the limit operation point moves to the low load side as the SOC of the battery 22 is lower, and moves to the high load side as the SOC of the battery 22 is higher. As described above, the target intake air temperature is the temperature by which the combustion stability is surely ensured when the engine 4 restarts at the limit operation point. Therefore, it is needed to decrease the target intake air temperature when the limit operation point moves to the high load side, and increase the target intake air temperature when the limit operation point moves to the low load side. Note that the reason for decreasing the target intake air temperature when the limit operation point moves to the high load side is to reduce NOx emission and improve fuel economy as much as possible while ensuring the combustion stability. According to such the relation between the SOC, the limit operation point and the target intake air temperature, the fourth processing unit 78 sets the target intake air temperature higher as the SOC of the battery 22 is lower, and sets the target intake air temperature lower as the SOC of the battery 22 is higher.

Figure 5:
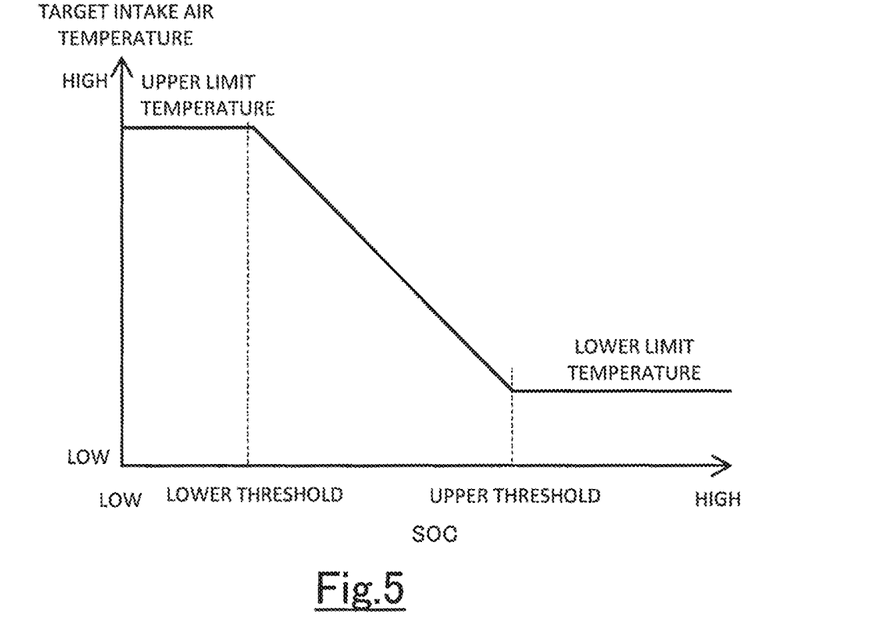
FIG. 5 is a diagram showing a relation between the SOC of the battery and the target intake air temperature in detail.

The SOC-target intake air temperature map of which the image is shown in FIG. 5 is used for setting the target intake air temperature. According to this map, when the SOC of the battery 22 is higher than the upper threshold, the target intake air temperature is kept to the lower limit temperature because the traveling mode switching line is kept to the predetermined upper limit line. When the SOC of the battery 22 is lower than the lower threshold, the target intake air temperature is kept to the upper limit temperature because the traveling mode switching line is kept to the predetermined lower limit line. In the SOC range defined by the upper threshold and the lower threshold, the intake air temperature during the stopping of the engine 4 is controlled to a lower temperature as the SOC of the battery 22 is higher, and is controlled to a higher temperature as the SOC of the battery 22 is lower. Note that the change of the target intake air temperature with respect to the SOC in the above SOC range may be a continuous change or a stepwise change.

According to the controller 70 having the above functions, the intake air temperature during the stopping of the engine 4 is controlled to a high temperature when the possibility of the engine 4 restarting in the low load range has increased as a result of the motor traveling range being reduced to the low load side due to the low SOC of the battery 22. Then, in the SOC range defined by the upper threshold and the lower threshold, the intake air temperature during the stopping of the engine 4 is controlled to a higher temperature as the motor traveling range is reduced to the low load side. Controlling the intake air temperature as above ensures the combustion stability when the engine 4 restarts.

Also, the intake air temperature during the stopping of the engine 4 is controlled to a lower temperature when the possibility of the engine 4 restarting in the low load range has decreased as a result of the motor traveling range being expanded to the high load side due to the high SOC of the battery 22. Then, in the SOC range defined by the upper threshold and the lower threshold, the intake air temperature during the stopping of the engine 4 is controlled to a lower temperature as the motor traveling range is expanded to the high load side. This makes it possible to reduce NOx emission and improve fuel economy while ensuring the combustion stability when the engine 4 restarts.

3. Intake Air Temperature Control by Controller

Figure 6:
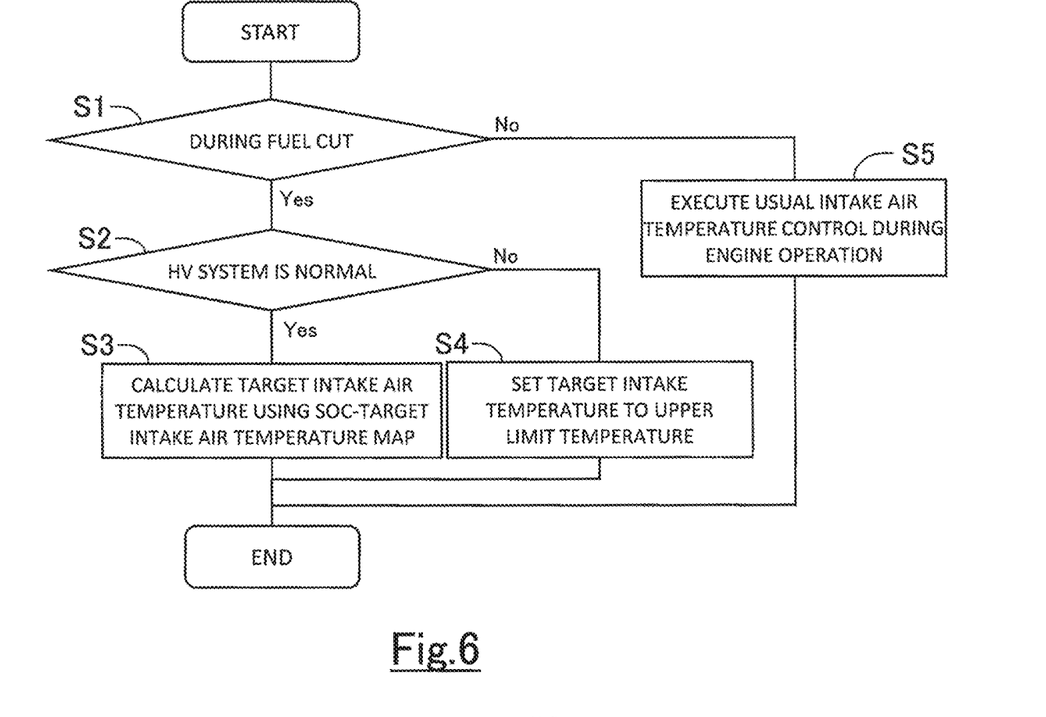
FIG. 6 is a flowchart showing intake air temperature control.

The intake air temperature control for the engine 4 executed by the controller 70 will be described with reference to FIG. 6. The controller 70 repeatedly executes the processing shown in the flowchart in FIG. 6 at a predetermined control cycle.

First, in step S1, it is determined whether or not fuel cut of the engine 4 is in progress, that is, whether or not the operation in the motor traveling mode is being performed. When the fuel cut of the engine 4 is not in progress, the processing of step S5 is executed. In step S5, usual intake air temperature control that is executed when the engine 4 is operating is executed. In the usual intake air temperature control, the target intake air temperature when the engine 4 is operating is calculated based on the request load and the engine speed. Note that the word "usual" in the usual intake air temperature control means that this control is not such a special one as the intake air temperature control executed when the fuel cut is in progress.

When the fuel cut of the engine 4 is in progress, the processing of step S2 is executed. In step S2, it is determined whether or not the hybrid system is in a normal condition. Specifically, it is determined whether or not abnormality that makes the motor traveling impossible has occurred in the motor 8 and the motor control system such as the battery 22, the invertor 18 and the like. This determination is executed by a self-diagnosis function installed in the vehicle for example.

When the hybrid system is in a normal condition, the processing of step S3 is executed. In step S3, the target intake air temperature in accordance with the SOC of the battery 22 is calculated by using the above described SOC-target intake air temperature map. The target intake air temperature is updated at a predetermined control cycle in accordance with the SOC of the battery 22, which is ever-changing.

On the other hand, when the hybrid system is in an abnormal condition, the processing of step S4 is executed. In step S4, it is executed to set the target intake air temperature to the upper limit temperature. When abnormality has occurred in the hybrid system, it becomes difficult to determine the operating range where the power apparatus is switched from the motor 8 to the engine 4. Therefore, in the present embodiment, assuming switching in the low load range where the combustion stability of the engine 4 tends to deteriorate, the intake air temperature during the stopping of the engine 4 is controlled to the upper limit temperature. This ensures the combustion stability of the engine 4 when the engine 4 restarts due to the abnormality occurred in the hybrid system.

Figure 7:
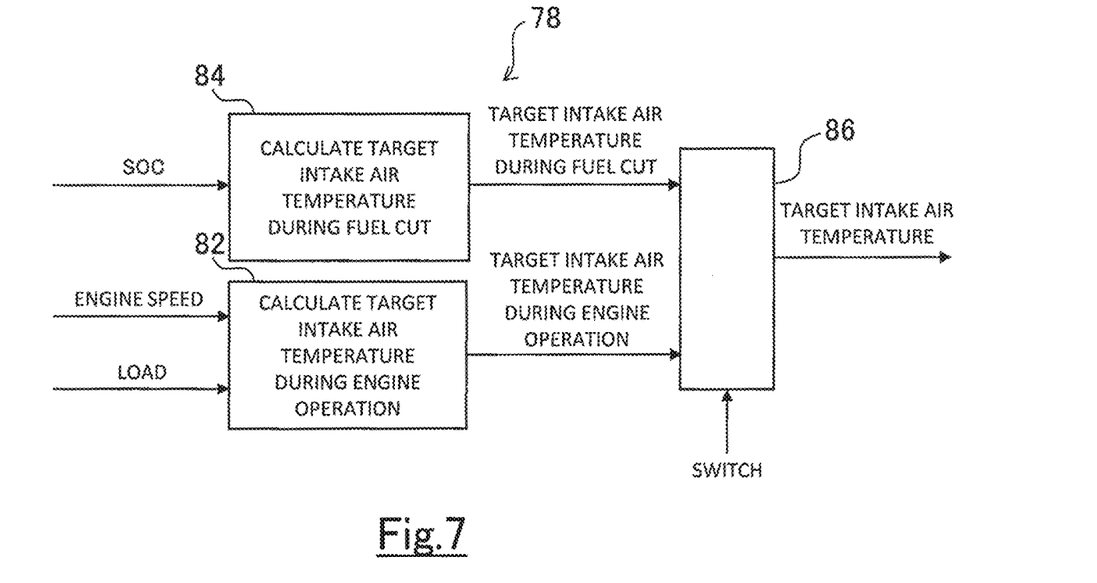
FIG. 7 is a block diagram illustrating a configuration for calculating the target intake air temperatures during fuel cut and during engine operation separately.

According to the above flowchart, the target intake air temperature is calculated by separate method during fuel cut and during engine operation. In FIG. 7, a configuration of the fourth processing unit 78 for achieving this is shown by a block diagram. The fourth processing unit 78 consists of a first unit 82, a second unit 84, and a third unit 86. The first unit 82 calculates the target intake air temperature during the engine operation based on the engine speed and the load. The second unit 84 calculates the target intake air temperature during the fuel cut based on the SOC of the battery 22. The target intake air temperature calculated by the first unit 82 and the target intake air temperature calculated by the second unit 84 are input into the third unit 86. The third unit 86 selects one of the input target intake air temperatures based on whether or not the fuel cut is in progress, and sets the selected one as the final target intake air temperature. In this block diagram, the processing by the first unit 82 corresponds to the processing of step S5, the processing by the first unit 84 corresponds to the processing of step S3, and the processing by the first unit 86 corresponds to the processing of step S1.

Figure 8:
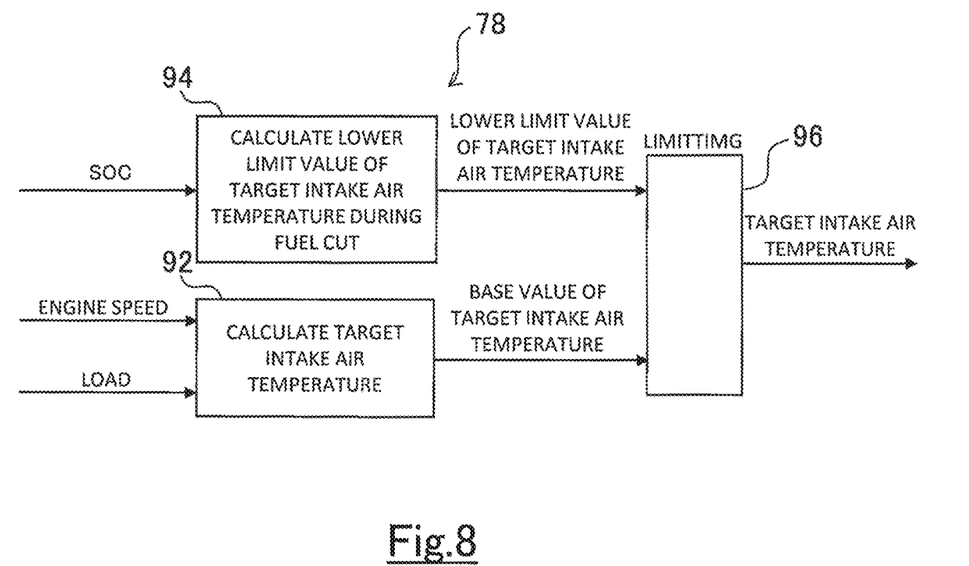
FIG. 8 is a block diagram illustrating a first modification of the configuration for calculating the target intake air temperatures during the fuel cut and during the engine operation separately.

FIG. 8 is a block diagram illustrating a first modification of the configuration of the fourth processing unit 78 for calculating the target intake air temperature. In the first modification, the fourth processing unit 78 consists of a first unit 92, a second unit 94, and a third unit 96. The first unit 92 calculates the target intake air temperature during the engine operation based on the engine speed and the load. The target intake air temperature calculated by the first unit 92 is used as a base value of a final target intake air temperature. The second unit 94 calculates a lower limit value of the target intake air temperature during the fuel cut based on the SOC of the battery 22. The lower limit value is equivalent to the target intake air temperature calculated by using the SOC-target intake air temperature map. The third unit 96 sets a temperature obtained by limiting the base value by the lower limit value as the final target intake air temperature.

Figure 9:
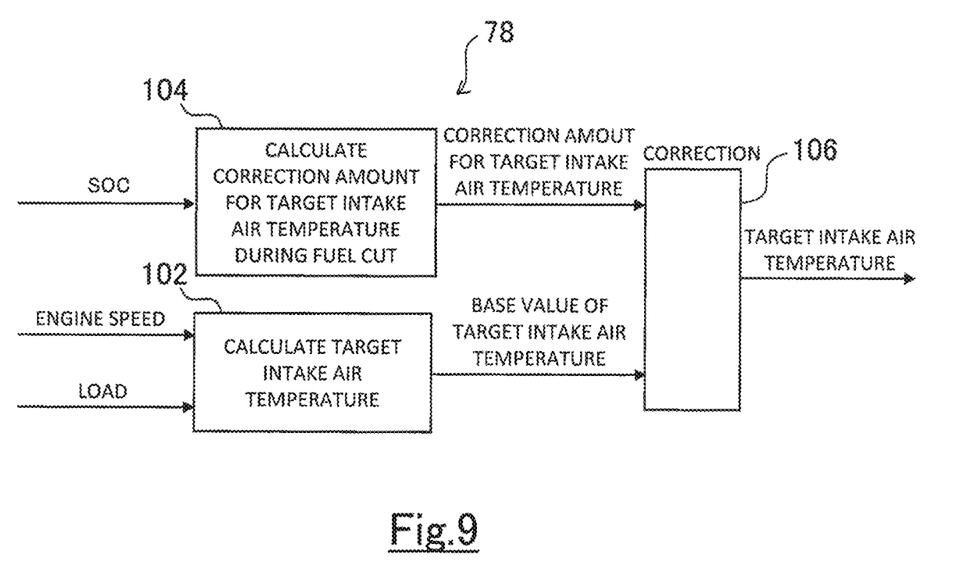
FIG. 9 is a block diagram illustrating a second modification of the configuration for calculating the target intake air temperatures during the fuel cut and during the engine operation separately.

FIG. 9 is a block diagram illustrating a second modification of the configuration of the fourth processing unit 78 for calculating the target intake air temperature. In the second modification, the fourth processing unit 78 consists of a first unit 102, a second unit 104, and a third unit 106. The first unit 102 calculates the target intake air temperature during the engine operation based on the engine speed and the load. The target intake air temperature calculated by the first unit 102 is used as a base value of a final target intake air temperature. The second unit 104 calculates a correction amount for the target intake air temperature during the fuel cut with respect to the target intake air temperature during the engine operation based on the SOC of the battery 22. The correction amount during the engine operation is zero. The third unit 106 sets a temperature obtained by adding the correction amount to the base value as the final target intake air temperature.

4. Other Embodiments

Figure 10:
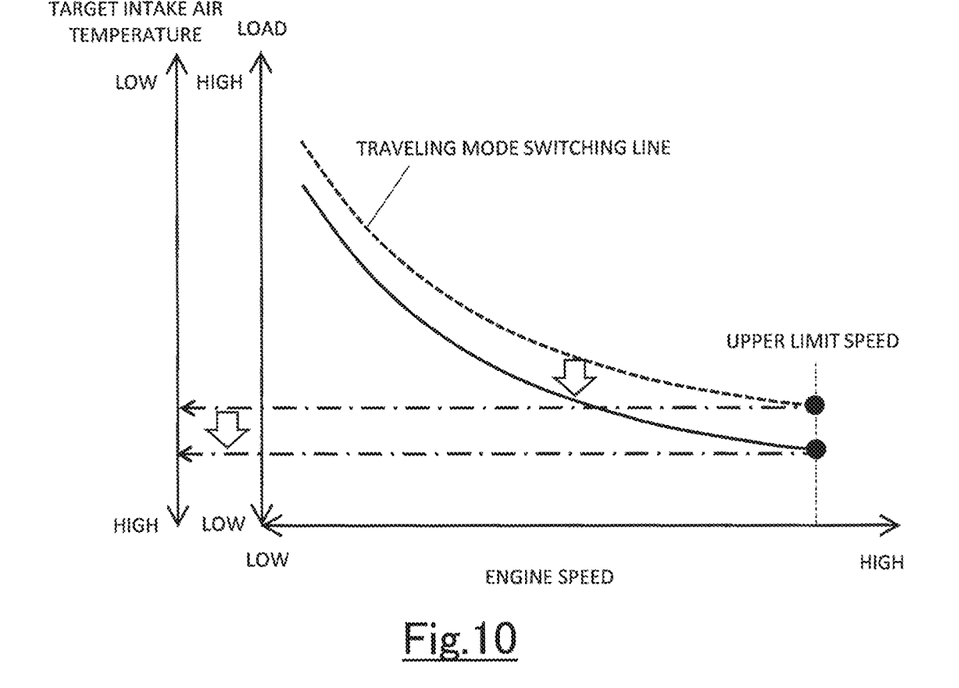
FIG. 10 is a diagram showing a relation between a temperature of the battery, the traveling mode switching line and the target intake air temperature.

The temperature of the battery 22 affects both charging electric power to the battery 22 and discharging electric power from the battery 22. The battery 22 has an appropriate temperature range. Charging and discharging of the battery 22 is restricted both at a temperature higher than the appropriate temperature range and at a temperature lower than the appropriate temperature range. In a situation where charging and discharging of the battery 22 is restricted, traveling by the motor 8 is also restricted. Therefore, as shown in FIG. 10, when the temperature of the battery 22 is out of the appropriate temperature range, the traveling mode switching line is moved to the low load side to reduce the motor traveling region.

Figure 11:
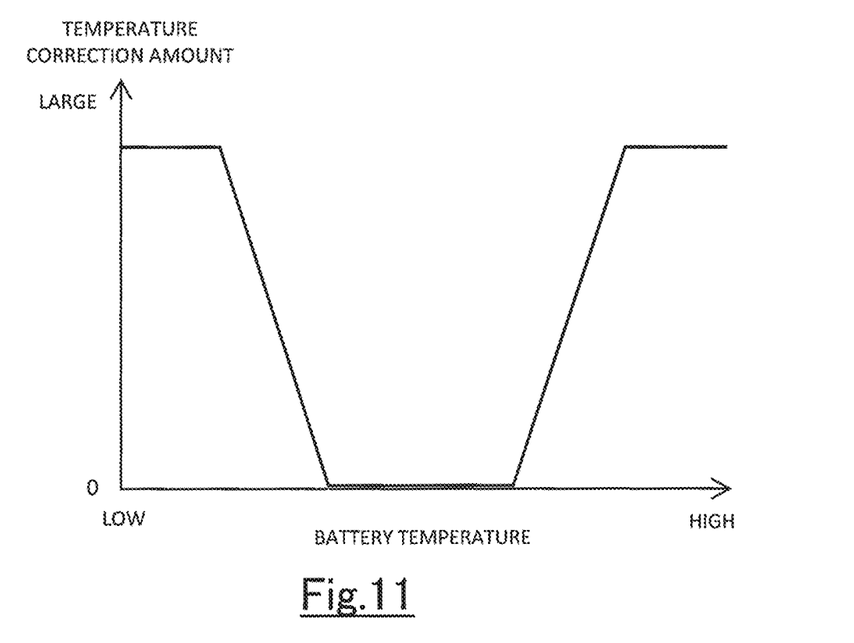
FIG. 11 is a diagram showing a relation between the temperature of the battery and a temperature correction amount.

When the traveling mode switching line moves to the low load side, the limit operation point corresponding to the upper limit speed on the traveling mode switching line also moved to the low load side. If the limit operation point moves to the low load side, the target intake air temperature should be corrected to the high temperature side to ensure the combustion stability. FIG. 11 is a diagram showing a relation between the temperature of the battery 22 and a temperature correction amount with respect to the target intake air temperature. The target intake air temperature is corrected to the high temperature side both when the temperature of the battery 22 is higher than a predetermined temperature range and when the temperature of the battery 22 is lower than the predetermined temperature range. Performing corrections as above suppresses the influence of the temperature of the battery 22 and ensures the combustion stability when the engine 4 restarts. Note that the temperature correction amount may be discretely changed between inside and outside of the predetermined temperature range as shown in FIG. 11, and also may be changed continuously or stepwisely.

What is claimed is:

1. A hybrid vehicle having an engine for traveling, a motor for traveling, and a battery for storing electric power to be supplied to the motor, comprising:
    an intake air temperature variable system that changes an intake air temperature during stopping of the engine; and
    a controller comprising at least one processor and at least one memory storing at least one program;
    wherein when the at least one program is executed by the at least one processor the at least one program causes the at least one processor to execute:
    first processing to select the engine as a power apparatus of the hybrid vehicle when a request load is higher than a threshold load, and select the motor as the power apparatus when the request load is equal to or lower than the threshold load;
    second processing to set the threshold load in accordance with a SOC of the battery, and decrease the threshold load as the SOC is lower in at least a predetermined SOC range;
    third processing to control the intake air temperature during the stopping of the engine to a target intake air temperature by operating the intake air temperature variable system when the motor is selected as the power apparatus; and
    fourth processing to set the target intake air temperature in accordance with the SOC, and increase the target intake air temperature as the SOC is lower in at least the predetermined SOC range.

2. The hybrid vehicle according to claim 1, wherein the controller sets the target intake air temperature to a predetermined upper limit temperature in the fourth processing when the SOC is lower than the predetermined SOC range.

3. The hybrid vehicle according to claim 1, wherein the controller sets the target intake air temperature to a predetermined lower limit temperature in the fourth processing when the SOC is higher than the predetermined SOC range.

4. The hybrid vehicle according to claim 1, wherein, when a temperature of the battery is higher than a predetermined temperature range, the controller corrects the threshold load to a low load side in the second processing and corrects the target intake air temperature to a high temperature side in the fourth processing.

5. The hybrid vehicle according to claim 1, wherein, when a temperature of the battery is lower than a predetermined temperature range, the controller corrects the threshold load to a low load side in the second processing and corrects the target intake air temperature to a high temperature side in the fourth processing.

6. The hybrid vehicle according to claim 1, wherein the controller sets the target intake air temperature to a predetermined upper limit temperature in the fourth processing when an abnormality occurs in the motor or a control system thereof.

* * * * *